US006473465B1

(12) United States Patent
Takahashi

(10) Patent No.: US 6,473,465 B1
(45) Date of Patent: Oct. 29, 2002

(54) METHOD AND APPARATUS FOR VIDEO CODING AT HIGH EFFICIENCY

(75) Inventor: Tsutomu Takahashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/369,147

(22) Filed: Aug. 5, 1999

(30) Foreign Application Priority Data

Aug. 6, 1998 (JP) ............................................ 10-223373

(51) Int. Cl.[7] .............................. G04N 7/26; G04N 7/50
(52) U.S. Cl. .................. 375/240.28; 348/722; 348/595; 348/571
(58) Field of Search ...................... 375/240.28; 382/274, 382/239; 348/625, 631, 97, 722, 571; H04N 7/26

(56) References Cited

U.S. PATENT DOCUMENTS 5,734,419 A * 3/1998 Botsford ....................... 348/97
5,847,772 A * 12/1998 Wells .......................... 348/571
6,084,641 A * 7/2000 Wu ............................. 348/722

FOREIGN PATENT DOCUMENTS

WO 97/49061 12/1997 ............ G06K/9/00

OTHER PUBLICATIONS

Von Peihong Hou, "Bewegungsschätzung Mit Erhöhter Zuverlässigkeit", 1993, pp. 153–161, vol. 37, No. 4, XP000394907.

M.S. Toller et al, "Video Segmentation using Combined Cues" 1997, pp. 414–425, XP000863555.

H. Nicolas et al, "Motion and Illumination Variation Estimation Using a Hierarchy of Models: Application to Image Sequence Coding" Dec. 1995, pp. 303–316, vol. 6, No. 4, XP000198148.

Ramin Zabih et al, "A feature–based algorithm for detecting and classifying production effects" 1999, pp. 119–128, XP–000863547.

* cited by examiner

*Primary Examiner*—Chris Kelley
*Assistant Examiner*—Charles Parsons
(74) *Attorney, Agent, or Firm*—Sughrue Mion, PLLC

(57) ABSTRACT

High efficiency coding method and apparatus of a video data, in which even from video data in a fade-in or fade-out state, coded video data which does not cause a deterioration of a picture quality upon decoding of said video data can be obtained. When the image based on the video data is in the fade-in or fade-out state and many outline components are included in the image, a motion vector is detected from the luminance adjusted video data obtained by adjusting the luminance of the video data. When the number of outline components included in the image is small, the motion vector is directly detected from the video data and the video data is encoded by a motion compensation prediction according to the motion vector.

6 Claims, 1 Drawing Sheet

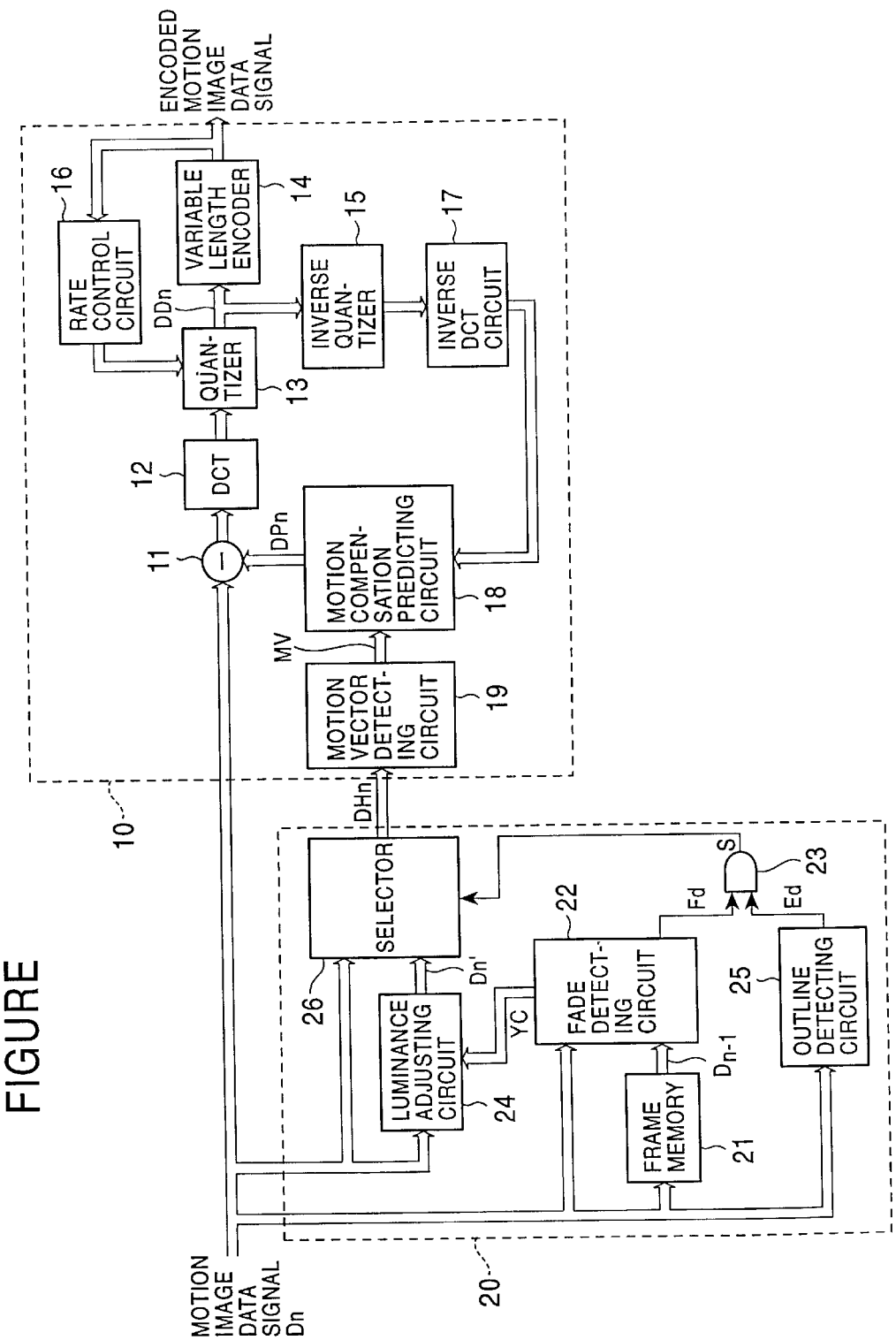

METHOD AND APPARATUS FOR VIDEO CODING AT HIGH EFFICIENCY

BACKGROUND OF THE INVENTION

1. Field of the Invention

The present invention relates to high efficient coding method and apparatus for performing compression of video data (dynamic image signal) at the time of transmitting or recording the video data.

2. Description of Related Art

An information amount of video data is enormous. In order to efficiently transmit (hereinbelow, the word "transmit" is used to represent also recording of data to a recording medium) the video data in a small information amount, various high efficient coding methods have been proposed.

For example, in an interframe predictive coding, an error between video data of the present frame and a prediction value obtained from video data in the frame which is N (N is a natural number) frames before or after the present frame is obtained as predictive error data and only the predictive error data is encoded by a variable length coding process.

According to this method, an amount of information to be transmitted can be largely compressed relative to that of the original video data. In the interframe predictive coding, however, a large prediction error can occur in a dynamic range in video data, to degrade the picture quality. In order to prevent it, an interframe motion compensation predictive coding is performed.

In the interframe motion compensation predictive coding, to obtain a prediction error between frames as described above, a motion vector is first obtained by using block matching as disclosed in Japanese Patent Kokai No. 8-65684.

In the block matching, first, one block consisting of, for example, (16×16) pixels in one frame is set as a target block for a motion vector detection and a predetermined region including the target block is specified as a search region. In the search region, while shifting a search block consisting of (16×16) pixels of the same size as that of the target block every pixel, the sum of the absolute value of a difference between each pixel value in the target block and each pixel value in the search block in the frame which is N (N is a natural number) frames before or after the target frame is obtained every search block. Among the search blocks, the search block which provides the smallest sum is detected and a vector directing from the center of the target block toward the center of the detected search block is obtained as a motion vector. When the series of operations is finished, a block obtained by shifting the target block only by one pixel is used as a new target block and the series of operations is executed again. By executing the operations for one frame, a plurality of motion vectors are obtained.

When the motion vector is obtained, a difference between a pixel value at the position of a movement destination that is predicted by the motion vector and a pixel value at the position of a moving source in the frame which is N (N is a natural number) frames before or after the target frame is obtained as a predictive difference and the predictive difference is subjected to a DCT (discrete cosine transform) process and a quantizing process. Data obtained by the quantizing process is encoded by a variable length coding and the resultant data is transmitted as an encoded video data.

In the block matching, however, as for such video data that a luminance level of the whole frame changes with the lapse of time as in the case of a fade-in or fade-out, an erroneous motion vector is detected. When the motion vector detection is performed by the block matching, therefore, the luminance level of the video data is successively corrected so that the luminance level change in association with the elapse of time as mentioned above does not occur, and the block matching is executed by using the video data in which the luminance has been corrected.

When the encoded video data obtained by performing those countermeasure is decoded and an image is displayed, there however arises a problem such that a flicker occurs in an image of, for example, a scene of the sea or sky in which the number of clear outlines is small.

OBJECT AND SUMMARY OF THE INVENTION

The invention has been made to solve this problem and it is an object of the invention to provide method and apparatus for coding video data at high efficiency, in which even from video data at the time of fade-in or fade-out, encoded video data which does not degrade the picture quality upon decoding can be obtained.

According to the invention, there is provided a high efficiency video data coding apparatus for obtaining encoded video data by encoding original video data at high efficiency, comprising: luminance adjusting means for obtaining luminance adjusted video data by adjusting a luminance of the original video data; motion vector detecting means for detecting a motion vector from the luminance adjusted video data when an image based on the original video data is in a fade-in or fade-out state and many outline components are included in the image and detecting the motion vector from the original video data when the number of outline components in the image is small; and an encoder for encoding the original video data by a motion compensation prediction according to the motion vector, thereby obtaining the encoded video data.

According to the invention, there is provided a high efficiency video data coding method for encoding original video data at high efficiency by using a motion compensation prediction according to a motion vector, comprising the steps of: detecting the motion vector from luminance adjusted video data obtained by adjusting a luminance of the original video data when an image based on the original video data is in a fade-in or fade-out state and many outline components are included in the image; and detecting the motion vector from the original video data when the number of outline components included in the image is small.

BRIEF DESCRIPTION OF THE DRAWING

The figure is a diagram showing an apparatus for coding video data at high efficiency according to the invention.

DETAILED DESCRIPTION OF THE PREFERRED EMBODIMENT

The figure shows the construction of a high efficiency coding apparatus according to the invention.

In the figure, video data $D_n$ comprising a series of pixel data samples corresponding to pixels in one frame is supplied to each of an MPEG (Moving Picture Experts Group) encoder 10 as a high efficiency encoder and a luminance correcting circuit 20.

The MPEG encoder 10 compresses the video data $D_n$ while performing a motion compensation on the basis of a motion vector detected from the supplied video data $D_n$, thereby obtaining encoded video data whose data amount has been reduced.

A subtractor 11 in the MPEG encoder 10 supplies data obtained by subtracting predictive video data $DP_n$ from the video data $D_n$ as predictive differential data to a DCT (Discrete Cosine Transform) circuit 12. The predictive video data $DP_n$ is obtained by a motion compensation predicting circuit 18, as will be explained later. The DCT circuit 12 supplies predictive differential DCT conversion data obtained by, for example, discrete cosine transforming the predictive differential data every block consisting of (8×8) pixels to a quantizer 13. The quantizer 13 quantizes the predictive differential DCT conversion data at a bit rate indicated by a bit rate signal supplied from a rate control circuit 16, which will be described later, in accordance with a predetermined quantizing rule and supplies a quantization predictive differential DCT conversion data $DD_n$ obtained at this time to each of a variable length encoder 14 and an inverse quantizer 15. The variable length encoder 14 performs a variable length encoding of the quantization predictive differential DCT conversion data $DD_n$ in accordance with a predetermined variable length encoding table and outputs resultant data as encoded video data. The rate control circuit 16 obtains a bit rate corresponding to the code length of the encoded video data and supplies a bit rate signal indicative of the bit rate to the quantizer 13.

The quantization predictive differential DCT conversion data $DD_n$ is restored to the original predictive differential data by a data processing system constituted by the inverse quantizer 15 and an inverse DCT circuit 17. The restored predictive differential data is supplied to the motion compensation predicting circuit 18. The motion compensation predicting circuit 18 obtains video data which is predicted as an image corresponding to the next frame on the basis of the restored predictive differential data and a motion vector MV detected by a motion vector detecting circuit 19. This video data becomes the predictive video data $DP_n$.

The motion vector detecting circuit 19 detects the motion vector by performing a block matching process as described hereinafter to corrected video data $DH_n$ supplied from the luminance correcting circuit 20, and supplies it as a motion vector MV to the motion compensation predicting circuit 18.

That is, in the motion vector detecting circuit 19, first, one block consisting of, for example, (16×16) pixels in one frame is used as a target block for motion vector detection, and a predetermined region including the target block is specified as a search region. In the search region, while shifting a search block consisting of (16×16) pixels of the same size as that of the target block every pixel, the sum of the absolute value of a difference between each pixel data sample value (as corrected video data $DH_n$) in the target block and each pixel data sample value in the search block in the frame which is N (N is a natural number) frames before or after the target frame is obtained every search block. A search block which provides the smallest sum is detected from the search blocks and the vector directing from the center of the target block toward the center of the detected search block is obtained as a motion vector MV. When the series of operations is finished, the block obtained by shifting the target block by only one pixel is set to a new target block and the series of operations is repeatedly executed, thereby sequentially obtaining a plurality of motion vectors MV of one frame.

A frame memory 21 in the luminance correcting circuit 20 sequentially writes the supplied video data $D_n$ and delays it only by one frame period and delayed data is read out. The video data which was delayed only by one frame period in the frame memory 21 and was read out therefrom is video data $D_{n-1}$ which is one frame before the video data $D_n$. The video data $D_{n-1}$ is supplied to a fade detecting circuit 22.

The fade detecting circuit 22 compares the video data $D_n$ with the video data $D_{n-1}$ which is one frame before the video data $D_n$, thereby detecting whether a fade-in or fade-out (hereinbelow, called a fade) in which the luminance level of the whole frame changes with the elapse of time has occurred or not. In this case, when the occurrence of the fade is detected, the fade detecting circuit 22 generates a fade detection signal Fd at the logic level "1". When it is detected that the fade does not occur, the fade detecting circuit 22 generates the fade detection signal Fd at the logic level "0". The signal Fd is supplied to an AND gate circuit 23. Further, when the occurrence of the fade is detected, the fade detecting circuit 22 obtains an average luminance rising level in each pixel data sample value by comparing the video data $D_n$ with the video data $D_{n-1}$, and supplies a luminance correction signal YC corresponding to the average luminance rising level to a luminance adjusting circuit 24.

The luminance adjusting circuit 24 supplies luminance adjusted video data $D_n'$ obtained by adjusting the luminance level of the whole video data $D_n$ only by an amount corresponding to the luminance correction signal YC to a selector 26. By the adjustment of luminance, even if a fade occurred in the video data $D_n$, with respect to the luminance adjusted video data $D_n'$, the luminance level change in the whole frame in association with the elapse of time is eliminated.

An outline detecting circuit 25 detects whether many outlines are included in the image of one frame displayed by the video data $D_n$ or not, and supplies an outline detection signal Ed according to the detection result to the AND gate circuit 23.

For example, the outline detecting circuit 25 first sequentially obtains a differential value of pixel data samples (in the video data $D_n$) corresponding to neighboring pixels every frame and counts the number of absolute values of the differential values which exceed a predetermined threshold value. Subsequently, whether the count value exceeds a predetermined value or not is determined. When it exceeds the predetermined value, the outline detection signal Ed at the logic level "1" indicating that an image having many outline components has been detected is supplied to the AND gate circuit 23. When it does not exceed the predetermined value, the outline detection signal Ed at the logic level "0" indicating that an image in which the number of outline components is small has been detected is supplied to the AND gate circuit 23.

The AND gate circuit 23 supplies a selection signal S at the logic level "1" only when both the outline detection signal Ed and fade detection signal Fd are at the logic level "1" to the selector 26. The AND gate circuit 23 supplies the selection signal S at the logic level "0" to the selector 26 in the other cases.

That is, only when the fade is detected from the video data and there are many outline components in the image, the AND gate circuit 23 supplies the selection signal S at the logic level "1" to the selector 26.

When the logic level of the selection signal S is equal to "1", the selector 26 selects the luminance adjusted video data $D_n'$ from the video data $D_n$ and luminance adjusted video data $D_n'$ and supplies it as corrected video data $DH_n$ to the motion vector detecting circuit 19. When the logic level of the selection signal S is equal to "0", the selector 26 selects the video data $D_n$ from the video data $D_n$ and luminance adjusted video data $D_n'$ and supplies it as corrected video data $DH_n$ to the motion vector detecting circuit 19.

That is, only when the fade is detected from the video data and the video data shows an image having many outline components, the selector 26 supplies the luminance adjusted video data $D_n'$ whose luminance has been adjusted by the luminance adjusting circuit 24 to the motion vector detecting circuit 19. In the other cases, the supplied video data $D_n$ is supplied as it is to the motion vector detecting circuit 19. That is, although the fade was detected from the video data, when the video data indicates an image in which the number of outline components is small, the supplied video data $D_n$ is supplied as it is to the motion vector detecting circuit 19 without executing the luminance adjustment.

According to the invention as mentioned above, when the image based on original video data is in the fade-in or fade-out state and many outline components are included in the image, the motion vector is detected from the luminance adjusted video data obtained by adjusting the luminance of the original video data. When the number of outline components included in the image is small, the motion vector is detected directly from the original video data and the original video data is encoded by the motion compensation prediction according to the motion vector.

When video data (in the fade state) encoded according to the invention is decoded and displayed, therefore, even if the image is an image like a scene of the sea or sky in which the number of clear outlines is small, a preferable picture quality in which no flicker occurs can be obtained.

What is claimed is:

1. A high efficiency video data coding apparatus for obtaining encoded video data by encoding original video data at high efficiency, comprising:

luminance adjusting means for obtaining luminance adjusted video data by adjusting a luminance of said original video data;

motion vector detecting means for detecting a motion vector from said luminance adjusted video data when an image based on said original video data is in a fade-in or fade-out state and many outline components are included in said image and detecting said motion vector from said original video data when the number of said outline components in said image is small; and an encoder for encoding said original video data by a motion compensation prediction according to said motion vector, thereby obtaining said encoded video data.

2. An apparatus according to claim 1, wherein said motion vector detecting means comprises:

a fade detecting circuit for detecting whether said image is in said fade-in or fade-out state;

an outline detecting circuit for detecting whether said outline components of the number larger than a predetermined value are included in said image or not;

a selecting circuit for generating said luminance adjusted video data as corrected video data in the case where it is detected by said fade detecting circuit that said image is in said fade-in or fade-out state and it is detected by said outline detecting circuit that said outline components of the number larger than a predetermined value are included, and generating said original video data as said corrected video data when it is detected by said outline detecting circuit that the number of said outline components is smaller than said predetermined value; and a motion vector detecting circuit for detecting said motion vector from said corrected video data.

3. An apparatus according to claim 2, wherein said vector detecting circuit detects said motion vector from said corrected video data by a block matching comprising the steps of:

while a search block constructed by a same pixel group as that of a target block consisting of a plurality of neighboring pixels in one frame is shifted every pixel in a predetermined search region including said target block, obtaining the sum of each absolute value of a difference between said corrected video data in said target block and said corrected video data in said search block in the frame which is N (N is a natural number) frames before or after the present frame;

detecting the search block in which said sum is the smallest; and obtaining, as said motion vector, a vector directing from a center of said target block toward a center of said search block in which said sum is the smallest.

4. An apparatus according to claim 1, wherein said luminance adjusting means adjusts the luminance of said original video data so that a luminance level change of the whole frame in association with the elapse of time is eliminated.

5. An apparatus according to claim 1, wherein said encoder is an MPEG (Moving Picture Experts Group) encoder.

6. A high efficiency coding method of a video data for encoding original video data at high efficiency by using a motion compensation prediction according to a motion vector, comprising the steps of:

detecting said motion vector from luminance adjusted video data obtained by adjusting a luminance of said original video data when an image based on said original video data is in a fade-in or fade-out state and many outline components are included in said image; and detecting said motion vector from said original video data when the number of said outline components included in said image is small.

* * * * *